US007774792B2

(12) United States Patent  
Anderson et al.

(10) Patent No.: US 7,774,792 B2  
(45) Date of Patent: Aug. 10, 2010

(54) AUTOMATIC CREATE, UPDATE AND DELETE EVENT PUBLISHING

(75) Inventors: Jeffrey R. Anderson, West Fargo, ND (US); John Healy, West Fargo, ND (US); Josh Honeyman, Bellevue, WA (US); Ryan A. Munson, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1280 days.

(21) Appl. No.: 11/175,117

(22) Filed: Jul. 5, 2005

(65) Prior Publication Data

US 2007/0011266 A1    Jan. 11, 2007

(51) Int. Cl.  
*G06F 3/00* (2006.01)  
*G06F 15/173* (2006.01)

(52) U.S. Cl. ................................. 719/318; 709/223

(58) Field of Classification Search .............. 719/318; 713/100; 709/223  
See application file for complete search history.

(56) References Cited

U.S. PATENT DOCUMENTS

| | | | |
|---|---|---|---|
| 6,782,541 B1 * | 8/2004 | Cohen et al. ............ | 719/318 |
| 7,043,566 B1 * | 5/2006 | Grant et al. ............. | 719/323 |
| 2003/0217292 A1 * | 11/2003 | Steiger et al. .......... | 713/201 |
| 2006/0230263 A1 * | 10/2006 | Bhogal et al. .......... | 713/100 |
| 2007/0180075 A1 * | 8/2007 | Chasman et al. ....... | 709/223 |

OTHER PUBLICATIONS

"Web Services Eventing (WS-Eventing)", Don Box et al., Aug. 2004.  
"A Guide to Developing and Running Connected Systems with Indigo", Don Box, from the Jan. 2004 issue of MSDN Magazine.

* cited by examiner

*Primary Examiner*—Lechi Truong  
(74) *Attorney, Agent, or Firm*—Westman, Champlin & Kelly, P.A.

(57) ABSTRACT

A system for providing automatic event publication relative to data owned by a service is disclosed. A service which owns data publishes internal events when data is created, updated, or deleted. These internal events are only visible by consumers on the same physical computer and running within the same process or executable. Consumers who are located remotely or in a separate process cannot subscribe to these events. Embodiments provide the ability to expose local entity create, update, and delete events as "public" events (or out-only messages) on a service contract. This allows external consumers who may be remote and even on a different platform, to subscribe and receive notifications of when data changes in the owning service.

8 Claims, 5 Drawing Sheets

AUTOMATIC CREATE, UPDATE AND DELETE EVENT PUBLISHING

BACKGROUND

A service is a system that a consumer of the service interacts with through a set of coarse-grained messages. A service oriented application may be composed of one or more services. Each of these application services typically contains a set of entities. Entities, in general, encapsulate data and provide a rich programming model for creating, reading, updating and deleting the data owned by the service.

Services typically contain private data and public data. The private data is encapsulated in an internal entity so that, within the service, the programming model provides access to all of the data and associations contained in the internal entity, but external to the service, the internal entity is not exposed through the service interface. However, public data is encapsulated in a publicly available entity which is available to consumers of the service.

It is common for a consumer of a service to access data of an entity owned by the service. One prior way for enabling this had the consumer directly access the owning service's data store. However, direct access to the owning service's data store requires the consumer of the data to have knowledge of the technology and table structure used by the owning service to store data in its data store. Similarly, such direct access allows the consumer to potentially view and change private data within the service. This is problematic for a number of reasons, and is discouraged in applications that honor the publicly known tenets of service orientation. These are set out in an article by Don Box entitled *Code Name Indigo: A Guide to Developing and Running Connected Systems with Indigo*, MSDN Magazine, January 2004. Basically, allowing an external service or client to bind directly to the owning service's data (either by access to the service's private entities or by directly accessing the data store which the service stores its data in) is a technique that compromises data integrity, the autonomy, and the explicit boundaries of the service in a service oriented environment. Instead, all communication with a service should occur using standardized message exchange.

There are a variety of message exchange patterns which may occur in a service oriented environment. One of these patterns is out-only messaging. In this pattern multiple services, referred to as subscribers, subscribe to certain notifications from a given service, referred to as a publisher. At the appropriate times, that service then sends these notification messages to all interested subscribers. Uses for this message exchange pattern include synchronization subsystems, auditing subsystems, various business logic, and many others. The difficulty with utilizing this message exchange pattern today is the publisher must ensure that all appropriate out-only messages are sent, or risk corrupting or confusing any of the subscribers or subsystems using out-only messaging.

The out-only messaging pattern is very similar to the concept of eventing in many existing programming languages. Most application frameworks currently provide a way for business logic to subscribe to create, update and delete events within a service and perform local processing logic when they occur. However, when a separate service wishes to be notified about these create update and delete events, it must subscribe and be notified via messaging. One way a service subscribes and is notified of these events is defined in the WS-Eventing specification. This specification does not provide guidance on how to ensure that all internal events are properly sent as external out-only messages however When a service holds data from another service, it becomes very important to synchronize that data with associated data in a local data store. Synchronization is the process through which data is replicated to a local data store and maintained by applying changes made to the owning service's data store to the consumer's data store. For instance, a consumer may wish to periodically synchronize data from the owning service's data store to its own local data store.

SUMMARY

A system for providing automatic event publication relative to data owned by a service is disclosed. A service which owns data publishes internal events when data is created, updated, or deleted. These internal events are only visible by consumers on the same physical computer and running within the same process or executable. Consumers who are located remotely or in a separate process cannot subscribe to these events. Embodiments provide the ability to expose local entity create, update, and delete events as "public" events (or out-only messages) on a service contract. This allows external consumers who may be remote and even on a different platform, to subscribe and receive notifications of when data changes in the owning service.

DETAILED DESCRIPTION OF ILLUSTRATIVE EMBODIMENTS

Embodiments disclosed herein generally provide, or otherwise facilitate, ensuring that all internal events within a service are sent out correctly. This helps ensure that no data is lost or corrupted.

Figure 1:
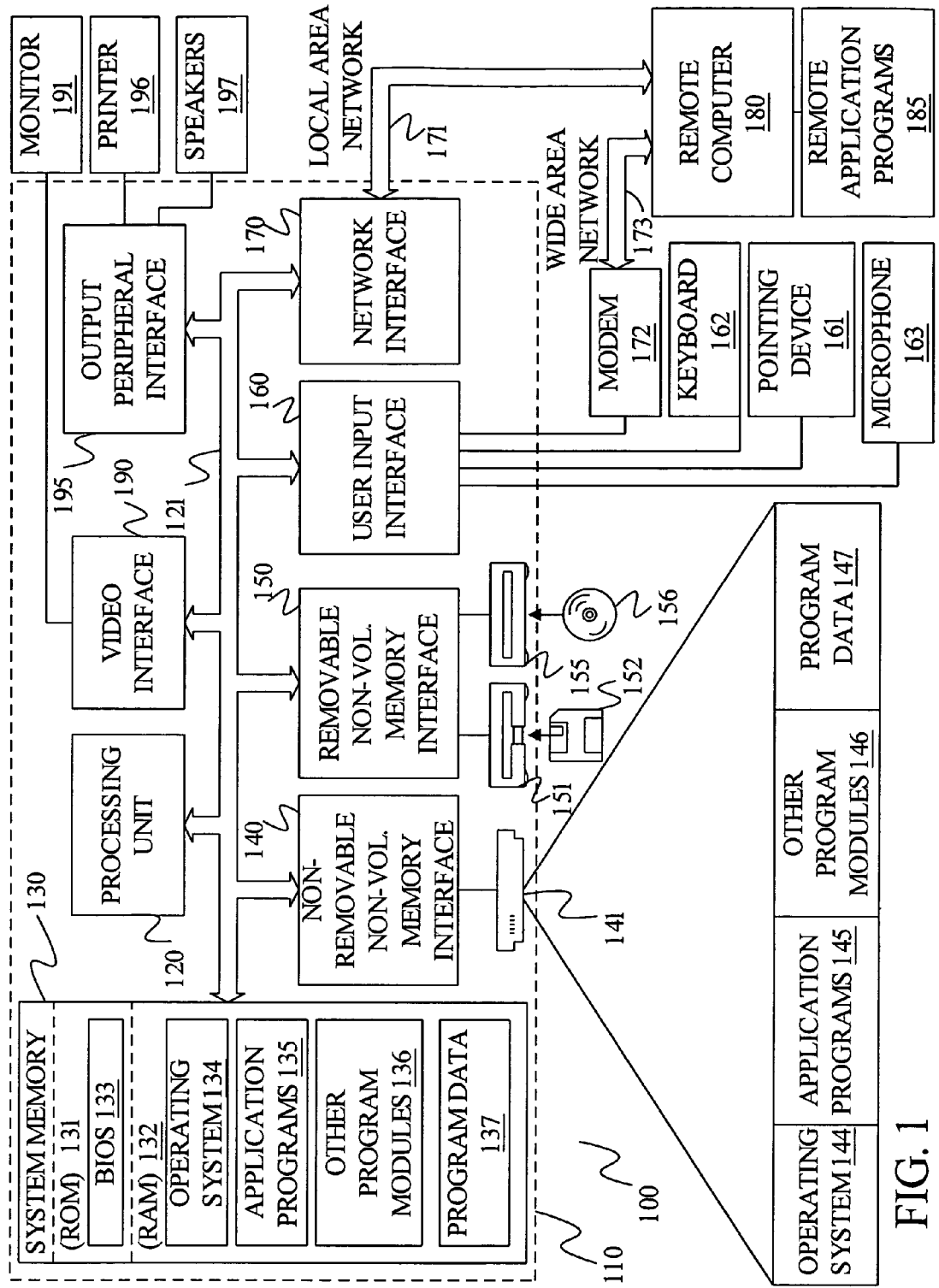
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
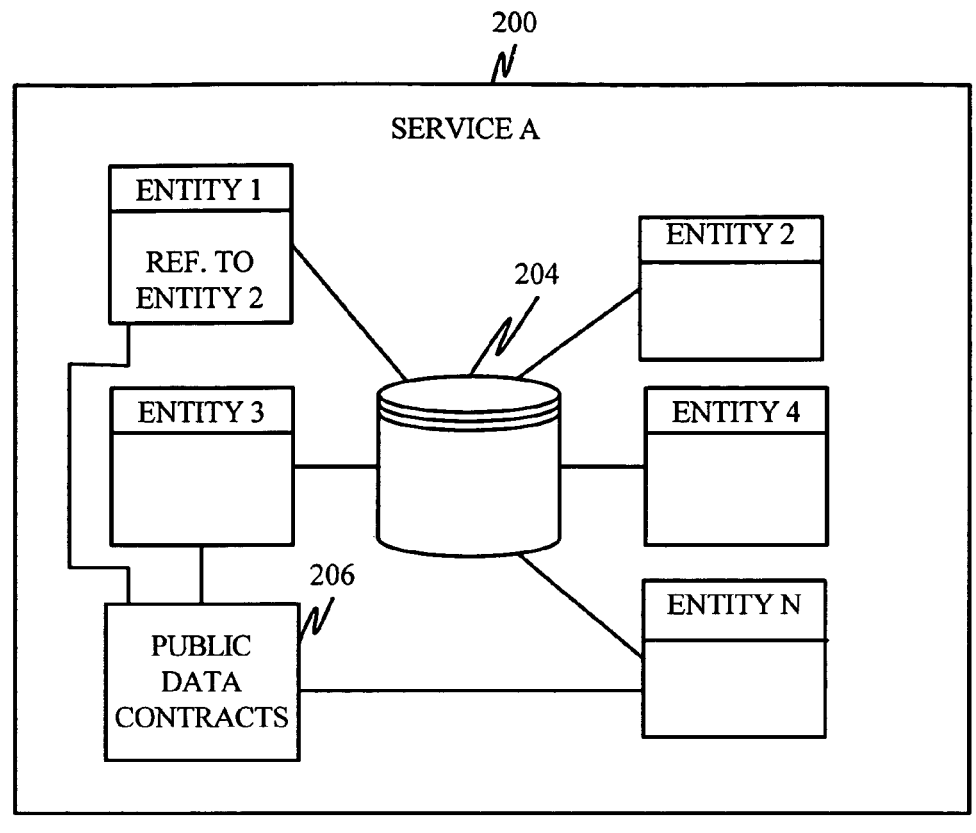
FIG. 2 is a block diagram of two services, each with entities and public data contracts.
Figure 2:
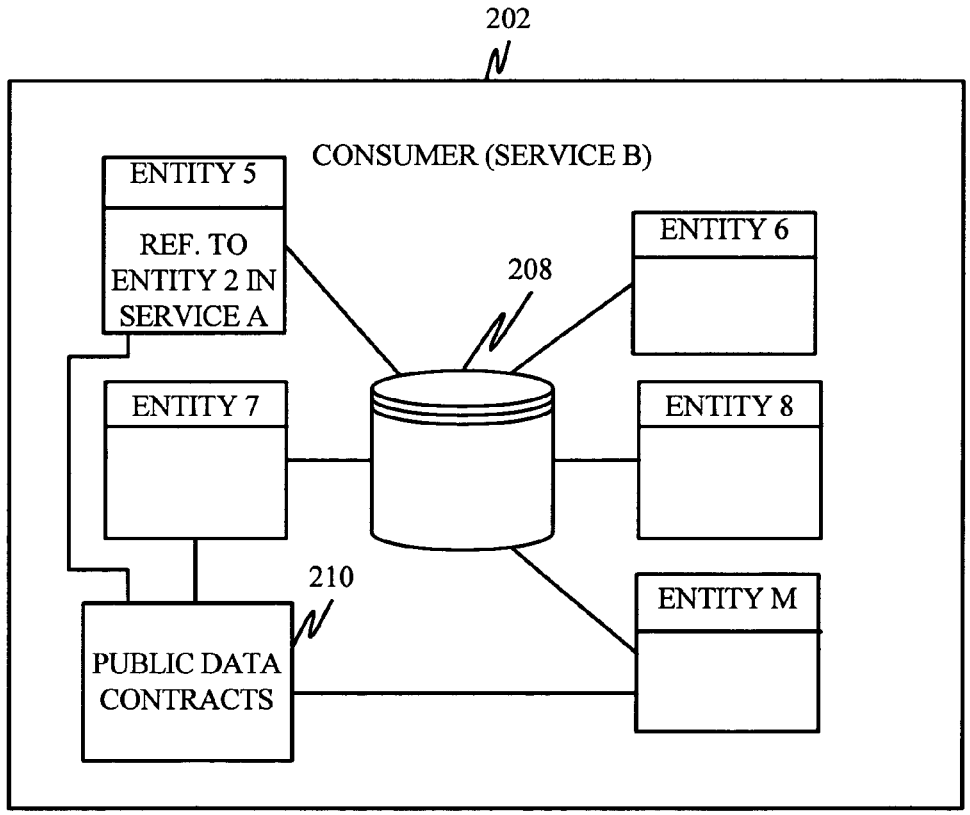

FIG. 2 is a block diagram of two autonomous services, service A represented by numeral 200 and service B represented by numeral 202. Service A is shown with a plurality of entities (entity 1-entity N) that are stored in a data store 204 that is local to service A. FIG. 2 also shows that service A includes one or more public data contracts 206 that represent the entities, how they are related, and the publicly available properties in each of those entities. The data contracts in FIG. 2 are shown connected to a number of the entities for the sake of illustration. There may illustratively be one data contract per entity. However, the data contracts could be arranged in other ways as well.

Service B also includes a plurality of entities (entity 5-entity M) that are stored in a data store 208 that is local to service B. FIG. 2 also shows that service B includes one or more public data contracts 210 that describe the entities, the relationships between the entities, and the publicly available properties for the entities found in service B. For the sake of the present discussion, service B is referred to as the consumer 202. That is because service B includes an entity (entity 5) that has a reference to data owned by service A. For instance, entity 5 in service B might consume data encapsulated by entity 2 owned by service A. Therefore, service B is designated as the consumer 202 because it consumes data owned by another service. It will of course be noted that by consumer it is meant a service, application, entity, or other component that requires access to data in another service.

Figure 3:
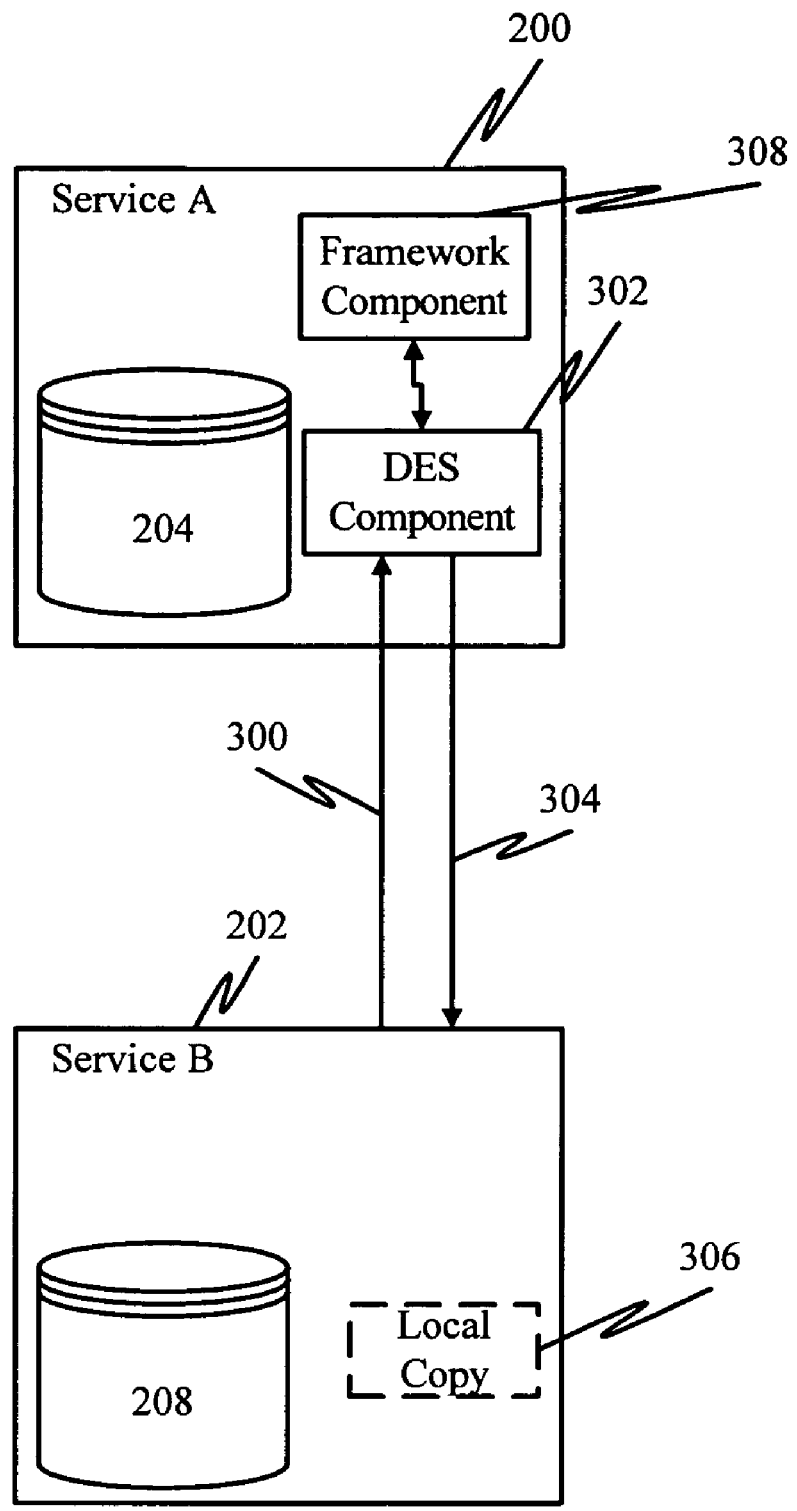
FIG. 3 is a block diagram of two services and a distributed event subsystem in accordance with an embodiment.

FIG. 3 is a diagrammatic view of a system for reliably generating at least one service message upon the occurrence of an internal create, update or delete event in accordance with one embodiment. FIG. 3 illustrates one example, in which service 202 sends a request 300 for data to distributed event subsystem component 302 of service 200, which is the owner of the reference data. Service 200 provides a response 304 to the request from service 202, which response may include a copy (indicated in phantom at 306) of the reference data owned by service 200. Service 202 stores local copy 306 of the requested reference data. The local copy can be stored in any form local to service 202, including being stored in local data store 208.

Service 200 can exist on one or more computer systems, such as that described above with respect to FIG. 1. Service 200 is supported by a programmatic framework 308 that provides rich interaction between service 200 and the underlying computer system(s). One example of such a framework is available under the trade designation NET Framework from Microsoft Corporation of Redmond, Wash. Framework 308 provides, or generates, events relative to data modifications (such as create, update or delete) within a given service.

In one example, an embodiment is used to facilitate data synchronization between services. However, it is important to note that embodiments can be used to provide automatic outgoing service messaging in any context, such as, but not limited to, synchronization subsystems, auditing subsystems, various business logic, and many other contexts. In accordance with one embodiment, subsystem 302 enlists as a local subscriber to all reference data modification events published by framework 308 within the reference service. These modification events include the creation, updating and deletion of data. When one of the reference data modification events occurs within the service that owns the reference data, distributed event subsystem component 302 preferably converts the internal event information provided by framework 308 into an appropriate outgoing message to send to one or more services that may be subscribing to Service A 204.

Distributed event subsystem 302 is illustrated in FIG. 3 as a single block. This illustration is provided for clarity, and subsystem 302 may be comprised of components that are implemented within or in conjunction with framework 308.

In one example, subsystem 302 can provide an important component in the automatic synchronization between reference data and one or more local copies exposed remotely therefrom. Without subsystem 302, developers would be forced to carefully send the appropriate create, update or delete messages to all subscribing services or run the risk of corrupting the reference data on the subscribing service(s). Since reference data may be changed in many, many places throughout the system, there is a high likelihood that without subsystem 302, at least one situation would arise where a create, update or delete event message is not sent out properly or not sent out at all.

Figure 4:
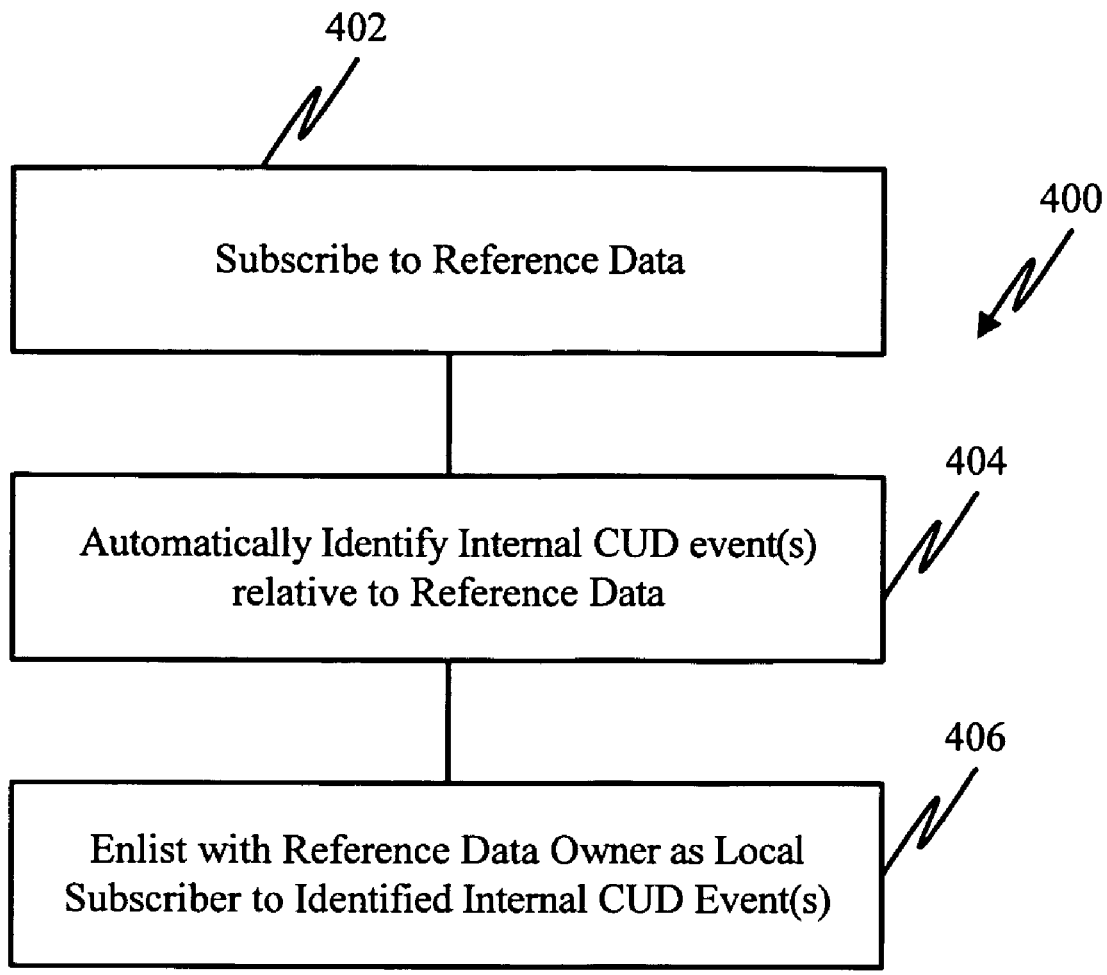
FIG. 4 is a flow diagram of a method of configuring a computer system to provide automatic create, update and delete messaging in accordance with an embodiment.

FIG. 4 is a flow diagram of a method of configuring a computer system to provide automatic create, update and delete messaging in accordance with an embodiment of the present invention. Method 400 begins at block 402 when a consumer service submits a "subscribe to reference data change" request to an owning service. An indication of this request is received by, or otherwise provided to, distributed event subsystem. At block 404, the distributed event subsystem identifies all internal events, within a framework supporting the owning service, that are related to the reference data. At block 406, the distributed event subsystem enlists, or otherwise subscribes, as a local subscriber within the owning service to the identified framework events. The subscription(s) created by the subsystem will be used to essentially forward any of the subscribed events within the framework to the subsystem for additional processing or handling.

Figure 5:
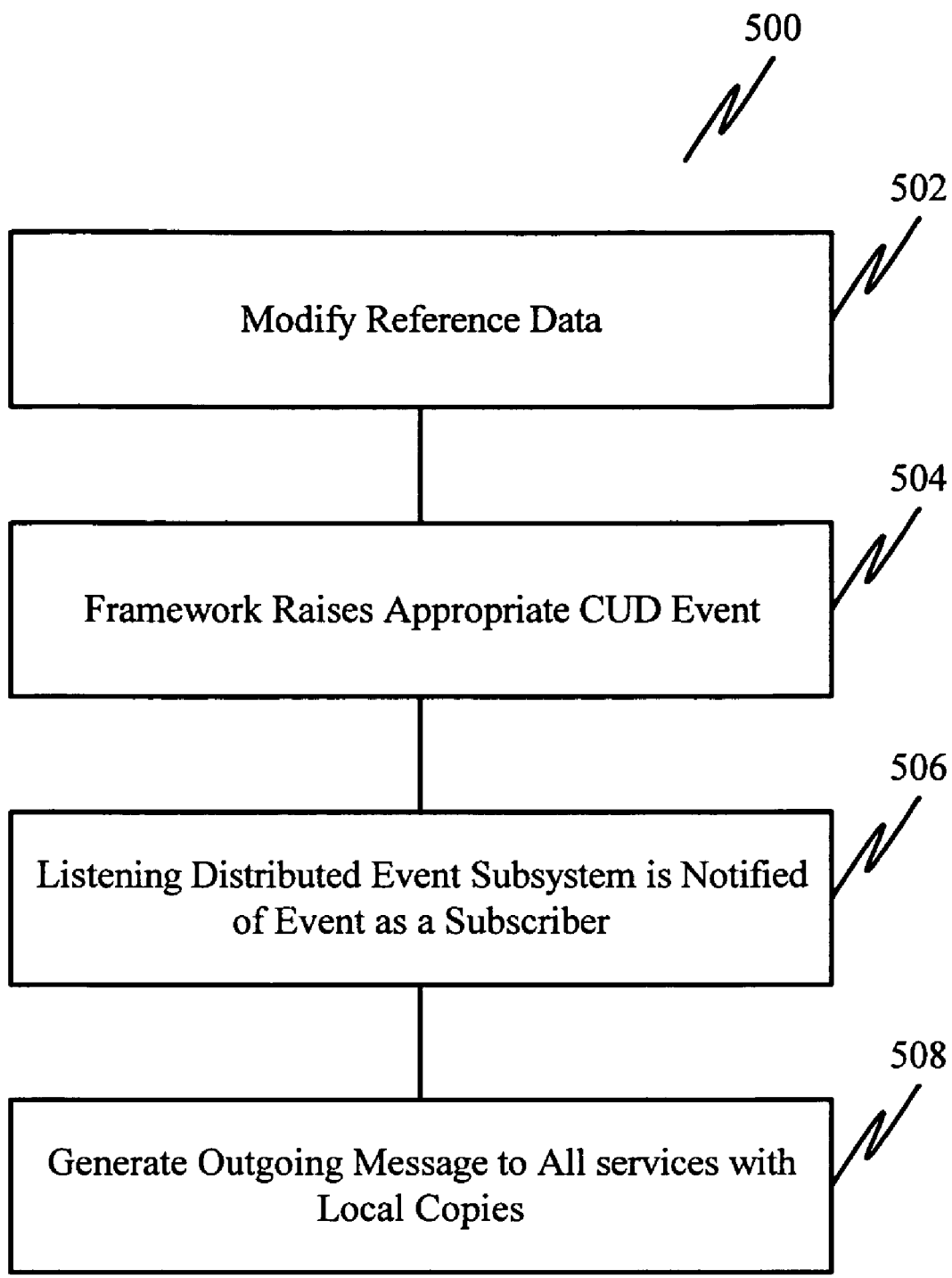
FIG. 5 is a flow diagram of a method of generating an outgoing service message upon modification of reference data within a service.

FIG. 5 is a flow diagram of a method of generating an outgoing service message upon modification of reference data within a service. Method 500 can be executed once method 400, described above, has been executed and the distributed event subsystem has subscribed to internal framework events relative to the reference data. Method 500 begins at block 502 when any of the reference data is modified. Examples of modification include the creation of data, updating of data and deletion of data. When this occurs, the framework, such as framework 308 raises an appropriate internal framework Create/Update/Delete (CUD) event, as indicated at block 504. Since the distributed event subsystem has registered as a subscriber to the internal framework event(s), it is notified of the event as indicated at block 506. This internal event notification provided to the distributed event subsystem may contain information that is not required by various services that have local copies of the reference data. Examples of such extraneous information include internal class information provided by the framework. Accordingly, at block 508, one or more suitable outgoing messages are composed based upon the internal event information. Preferably, any extraneous information in the internal event notification is removed. Additionally, the distributed event subsystem may add additional information to the outgoing message(s). Further still, in embodiments where distributed event subsystem stores information relative to which services are subscribers to which reference data owners, the distributed event subsystem may generate a number of outgoing messages to all services that it knows are subscribed to the reference data owner. Thus, the owning service provides a single event notification through its framework, which notification is then transformed and sent to a number of subscribing services. The subscribing services receive the event information from the distributed event subsystem and perform any applicable processing. In one example, this may be an update to their local copy such that all local copies reflect the updated reference data.

Block 508 is preferably executed as one physical transaction. In other words, the handling of the event and the placement of the outgoing message(s) on a reliable, durable message bus are performed as a single physical transaction. This helps ensure that referential data integrity is maintained (if the subscriber is storing data related to the event) and that no CUD events are lost.

The communication and generation of publisher and subscriber relationships in service oriented architectures are known. One example of a suitable inter-service messaging specification is known as the Web Services (WS) Eventing Specification, which specification is a collaboration between and among BEA Systems Inc., Computer Associates, Inc. International Business Machines Corporation, Microsoft Corporation Inc., Sun Microsystems, Inc and TIBCO Software Inc. While embodiments of the present invention can advantageously employ aspects of messaging in accordance with the WS-Eventing Specification, any suitable inter-service messaging can be used. Additionally, while publisher/subscriber relationships are known for service oriented architectures, there does exist one important modification to facilitate utilization of embodiments of the present invention. Specifically, these publisher/subscriber relationships were generally created for set periods of time, after which the relationship was automatically dissolved. However, since a given relationship is useful for an extended period of time, even when systems are restarted, it is preferred that the relationships described with respect to embodiments of the present invention be durable relationships. A durable relationship exists until the consumer no longer wishes to be subscribed to the event. The use of durable relationships ensures that such relationships continue to exist even if the owning service or subscribing service should fail and/or be restarted.

Although the present invention has been described with reference to particular embodiments, workers skilled in the art will recognize that changes may be made in form and detail without departing from the spirit and scope of the invention.

What is claimed is:

1. A computer-implemented system for providing automatic updates relative to reference data, the system comprising:
 a computer processor;
 an owning service that has access to the reference data and is supported by a managed code programmatic framework publishing internal framework event notifications indicative of events that involve modifications to the reference data;
 a portion of the reference data exposed remotely from the owning service;
  an event subsystem communicatively coupled to the managed code programmatic framework, wherein the event subsystem subscribes to a particular one of the internal framework event notifications published by the managed code programmatic framework, the particular internal framework event notification corresponding to an update event involving a modification to the portion of reference data exposed remotely from the owning service, wherein the event subsystem utilizes the computer processor that is a component of the computer to automatically convert an instance of the particular event notification into a plurality of service messages, wherein converting comprises removing extraneous information from the particular event notification, and wherein the event subsystem sends the plurality of service messages to a plurality of different consumer services;
 a particular consumer service that subscribes to an event provided by the event subsystem, said subscription to the event provided by the event subsystem being a durable subscription that causes the particular consumer service to become one of said plurality of different consumer services such that the particular consumer service becomes set to receive at least one of said plurality of service messages from the event subsystem, the subscription being durable in that the subscription continues to exist even if the owning service or the event subsystem fails or is restarted, and
 wherein the event subsystem, in a single transaction, both converts the instance of the particular event notification into the plurality of service messages and places the plurality of services messages on a durable message bus to be sent to the plurality of different consumer services including the particular consumer service.

2. The system of claim 1, wherein the event subsystem, in a single transaction, both converts the instance of the particular event notification into the plurality of service messages and sends the plurality of services messages to the plurality of different consumer services including the particular consumer service.

3. The system of claim 1, wherein the update event to which the particular internal framework event corresponds is a create event relative to the reference data.

4. The system of claim 1, wherein the update event to which the particular internal framework event corresponds is a delete event relative to the reference data.

5. The system of claim 1, wherein said subscription to the event provided by the event subsystem is a subscription provided by the event subsystem so as to be specifically limited to delivery of service messages that correspond to the particular internal framework event.

6. A computer-implemented method for facilitating communication between a source of reference data and a plurality of different service consumers of the reference data, the method comprising:
 providing a owning service having reference data, the owning service supported by a managed code framework generating an internal event notification in response to modification of the reference data, wherein a portion of the reference data is exposed remotely from the owning service;
 utilizing a computer processor that is a component of the computer to automatically enlist an event subsystem as a subscriber to the internal event notification, the internal event notification corresponding to an update event involving modification to the portion of the reference data exposed remotely from the owning service;
 wherein the event subsystem is configured to convert the internal event notification into a plurality of corresponding messages and send the corresponding messages to the plurality of different service consumers;

wherein automatically enlisting is performed in response to a "subscribe to reference data" request sent by the plurality of different service consumers to the event subsystem, the "subscribe to reference data request" being a request for a durable subscription that is durable in a sense that it continues to exist even if the owning service or the event subsystem fails or is restarted;

wherein converting the internal event notification into a plurality of corresponding messages comprises utilizing information in the internal event notification as the corresponding messages but excluding from the corresponding messages at least some extraneous information included in the event notification; and wherein the event subsystem, in a single transaction, both converts the internal event notification into the plurality of corresponding messages and places the plurality of corresponding messages on a durable message bus to be sent to the plurality of different service consumers.

7. The method of claim 6, wherein the update event involving a modification to the portion of the reference data exposed remotely from service is a create operation executed against the portion of the reference data exposed remotely from the service.

8. The method of claim 6, wherein the update event involving a modification to the portion of the reference data exposed remotely from the service is a delete operation executed against the portion of the reference data exposed remotely from the service.

* * * * *